(12) United States Patent
Yoo et al.

(10) Patent No.: US 9,184,837 B2
(45) Date of Patent: Nov. 10, 2015

(54) MOBILE TERMINAL CAPABLE OF LOCALIZATION, LOCALIZATION SERVER AND METHOD FOR LOCALIZING THE MOBILE TERMINAL USING THE LOCALIZATION SERVER

(71) Applicant: Foundation of Soongsil University-Industry Cooperation, Seoul (KR)

(72) Inventors: Myung-Sik Yoo, Seoul (KR); Jun-Ho Hwang, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 0 days.

(21) Appl. No.: 14/489,867

(22) Filed: Sep. 18, 2014

(65) Prior Publication Data
US 2015/0043924 A1 Feb. 12, 2015

Related U.S. Application Data

(62) Division of application No. 13/664,132, filed on Oct. 30, 2012.

(30) Foreign Application Priority Data

Nov. 29, 2011 (KR) .......................... 10-2011-0125808
Aug. 29, 2012 (KR) .......................... 10-2012-0095048

(51) Int. Cl.
*H04B 10/116* (2013.01)
*G01S 1/70* (2006.01)
*G01S 5/16* (2006.01)

(52) U.S. Cl.
CPC ................. *H04B 10/116* (2013.01); *G01S 1/70* (2013.01); *G01S 5/16* (2013.01)

(58) Field of Classification Search
CPC ....................................................... H04B 10/116
USPC .......................................................... 398/172
See application file for complete search history.

(56) References Cited

U.S. PATENT DOCUMENTS

| 5,231,646 | A * | 7/1993 | Heath et al. ................... 375/130 |
| 7,969,297 | B2 * | 6/2011 | Haartsen et al. .............. 340/531 |
| 2002/0089722 | A1 * | 7/2002 | Perkins et al. ................ 359/155 |

(Continued)

FOREIGN PATENT DOCUMENTS

| KR | 10-2010-0083578 | 7/2010 |
| KR | 10-2010-0083578 A | 7/2010 |

*Primary Examiner* — Leslie Pascal
(74) *Attorney, Agent, or Firm* — Mintz Levin Cohn Ferris Glovsky and Popeo, P.C.; Kongsik Kim; Jonathon Western

(57) ABSTRACT

A mobile terminal capable of localization, a localization server, and a method for localizing the mobile terminal using the localization server are disclosed. The disclosed localization server includes a control unit configured to control transmissions of visible-light signals from a multiple number of visible-light transmitting devices; and a position computing unit configured to compute a position of a mobile terminal based on time information regarding when the visible-light signals transmitted respectively from the plurality of visible-light transmitting devices were received at the mobile terminal, where the control unit controls the transmissions such that each of the plurality of visible-light transmitting devices sequentially transmits the visible-light signal for a particular first time period with no overlapping of transmission times of the visible-light signals transmitted respectively from the plurality of visible-light transmitting devices.

8 Claims, 10 Drawing Sheets

(56) References Cited

U.S. PATENT DOCUMENTS

| | | | |
|---|---|---|---|
| 2009/0171571 A1* | 7/2009 | Son et al. | 701/208 |
| 2010/0179786 A1* | 7/2010 | Lee et al. | 702/150 |
| 2011/0105134 A1* | 5/2011 | Kim et al. | 455/450 |
| 2013/0028612 A1* | 1/2013 | Ryan et al. | 398/172 |

* cited by examiner (a)

(b)

MOBILE TERMINAL CAPABLE OF LOCALIZATION, LOCALIZATION SERVER AND METHOD FOR LOCALIZING THE MOBILE TERMINAL USING THE LOCALIZATION SERVER

CROSS-REFERENCE TO RELATED APPLICATIONS

This application is a divisional application of U.S. application Ser. No. 13/664,132 filed on Oct. 30, 2012, which claims priority to Korean Application No. 10-2011-0125808 filed on Nov. 29, 2011 and Korean Application No. 10-2012-0095048 filed on Aug. 29, 2012, which applications are incorporated herein by reference.

TECHNICAL FIELD

Embodiments of the present invention relate to a mobile terminal capable of localization, a localization server, and a method for localizing the mobile terminal using the localization server, more particularly, to a mobile terminal capable of localization, a localization server, and a method for localizing the mobile terminal according to a TDoA (Time Difference of Arrival) scheme using visible-light signals.

BACKGROUND ART

A visible-light wireless communication system is a next-generation wireless communication technology in which digital signals are transmitted by controlling the light-emitting properties of an LED (light emitting device) and visible-light signals are received by using a PD (photodiode). In a visible-light wireless communication system, an LED may function not only as an indoor lighting device, but also as a transmitter for digital signals. Due to its inherent properties of the visible-light wireless communication system, its coverage area may be limited to a range that can be reached by the visible light, and the quality of the communication channel may be determined by the amount of visible light.

FIG. 1 schematically illustrates the structure of a conventional visible-light wireless communication system, where drawing (a) of FIG. 1 illustrates the structure of a visible-light transceiver, and drawing (b) of FIG. 1 illustrates the structure of a visible-light receiver.

To be more specific, the visible-light transceiver 110 may be composed of an LED 111 that emits visible light, an LED drive circuit 112 that controls the driving of the LED 111, a power source unit 113 that supplies power to the LED drive circuit 112, a signal modulator unit 114 that modulates digital signals inputted from the outside into visible-light signals, and a control unit 115 that controls the driving of the LED drive circuit in accordance with the modulated visible-light signals.

Also, the visible-light receiver 120 may be composed of a PD (121) that detects the on/off states of the visible light to receive the visible-light signals, and a signal demodulator unit 122 that demodulates the visible-light signals received via the PD 121 into digital signals.

An existing method of localizing a mobile terminal using visible-light wireless communication is to have multiple LEDs transmit visible-light signals, each including the ID of the respective LED, and to check the IDs in the visible-light signals received by the mobile terminal to measure the position of the mobile terminal. Although the existing localization method described above may have its advantages in terms of maintenance and costs in establishing the system, there may be the disadvantage of low localization accuracy.

Another method of localizing a mobile terminal using visible-light wireless communication is found in Xiaohan, et al., "Improved Indoor Location Estimation Using Fluorescent Light Communication System with a Nine-Channel Receiver," which discloses a method of arranging multiple PDs in a circular formation and measuring the position of the mobile terminal by using the intensities and the incident angles of the visible light received from various angles. Although the existing localization method described above may provide higher localization accuracy compared to the existing method using the IDs of the LEDs, there may be the disadvantage of high costs associated with establishing the system.

SUMMARY

An aspect of the present invention, devised to resolve the problems above, is to provide a mobile terminal capable of localization, a localization server, and a method for localizing the mobile terminal according to a TDoA (Time Difference of Arrival) scheme using visible-light signals.

Other objectives of the present invention can be readily derived by a person skilled in the art from the embodiments of the present invention described below.

To achieve the objectives above, an embodiment of the present invention provides a localization server that includes: a control unit configured to control transmissions of visible-light signals from a multiple number of visible-light transmitting devices; and a position computing unit configured to compute a position of a mobile terminal based on time information regarding when the visible-light signals transmitted respectively from the plurality of visible-light transmitting devices were received at the mobile terminal, where the control unit controls the transmissions such that each of the plurality of visible-light transmitting devices sequentially transmits the visible-light signal for a particular first time period with no overlapping of transmission times of the visible-light signals transmitted respectively from the plurality of visible-light transmitting devices.

Another embodiment of the present invention provides a mobile terminal capable of localization that includes: a receiver unit configured to receive visible-light signals, which are sequentially transmitted from a multiple number of visible-light transceiver devices for a particular first time period such that there is no overlapping of transmission times; a time measuring unit configured to generate receiving time information regarding times at which the sequentially transmitted visible-light signals were received; and a position computing unit configured to compute a position of the mobile terminal by using the receiving time information of the sequentially transmitted visible-light signals.

Yet another embodiment of the present invention provides a method for localizing a mobile terminal that includes: receiving visible-light signals, which are sequentially transmitted from a plurality of visible-light transceiver devices for a particular first time period such that there is no overlapping of transmission times; generating receiving time information regarding times at which the sequentially transmitted visible-light signals were received; and computing a position of the mobile terminal by using the receiving time information of the sequentially transmitted visible-light signals.

DETAILED DESCRIPTION

Figure 1:
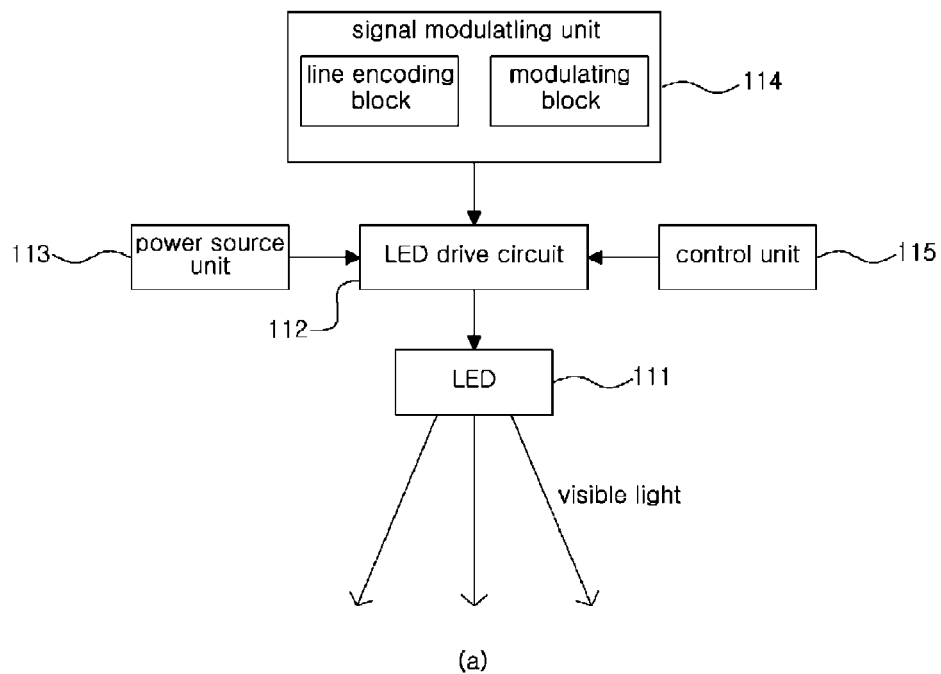
FIG. 1 schematically illustrates the structure of a conventional visible-light wireless communication system.
Figure 1:
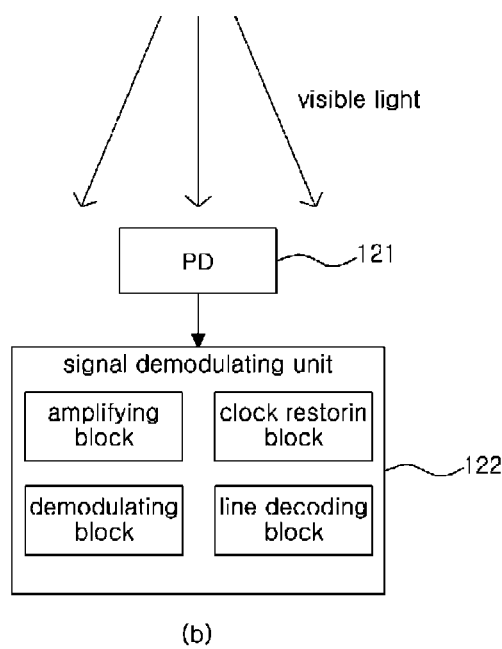

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the present invention will be described below in more detail with reference to accompanying drawings.

Figure 2:
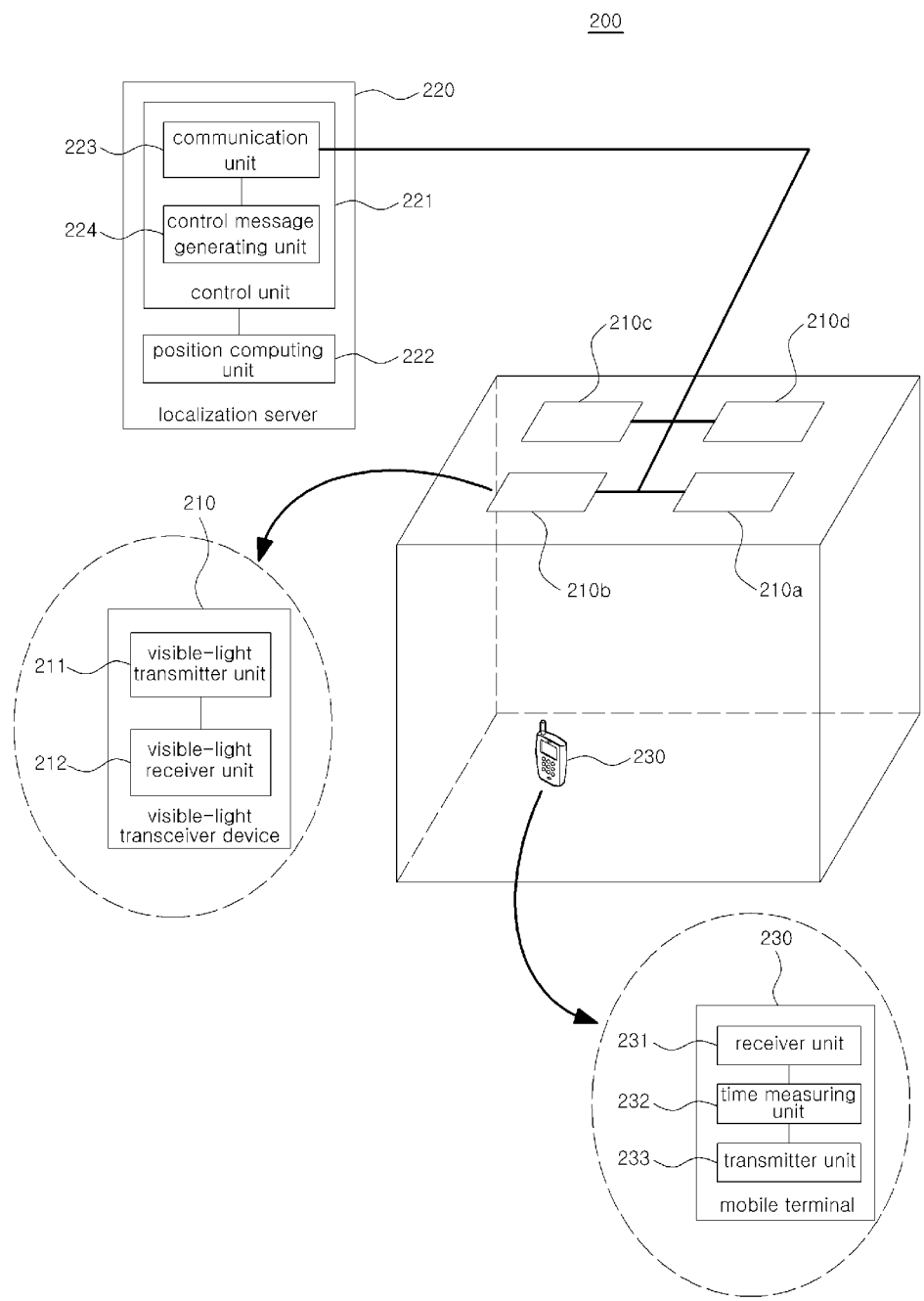
FIG. 2 schematically illustrates the structure of a localization system for a mobile terminal according to a first embodiment of the present invention.

FIG. 2 schematically illustrates the structure of a localization system for a mobile terminal according to a first embodiment of the present invention.

Referring to FIG. 2, a localization system 200 according to the first embodiment of the present invention may include a multiple number of visible-light transceiver devices 210, a localization server 220, and a mobile terminal 230. The function of each component will be described below in more detail.

The multiple number of visible-light transceiver devices 210 may transmit or receive visible-light signals. To be more specific, a visible-light transceiver device 210 can include a visible-light transmitter unit 211 such as an LED (light emitting diode), for transmitting visible-light signals, and a visible-light receiver unit 212 such as a PD (photodiode) for receiving visible-light signals.

As illustrated in FIG. 2, the multiple visible-light transceiver devices 210 can be arranged in the ceiling of an indoor space. While FIG. 2 illustrates an example in which there are four visible-light transceiver devices 210 arranged in an array, the number and arrangement of the visible-light transceiver devices 210 are not thus limited.

The localization server 220 may include a control unit 221 and a position computing unit 222, to control the transmissions of visible-light signals from the multiple visible-light transceiver devices 210 and compute the position of the mobile terminal 230 based on time information regarding when the visible-light signals were received at the mobile terminal 230. For this purpose, the localization server 220 can communicate with the multiple visible-light transceiver devices 210 via a wired or wireless connection.

To be more specific, the control unit 221 can include a communication unit 223, for communicating with the multiple visible-light transceiver devices 210 in a wired or wireless manner, and a control message generating unit 224, for generating control messages used to control the operations of the multiple visible-light transceiver devices 210.

The mobile terminal 230 can include a receiver unit 231, for receiving the visible-light signals transmitted from the multiple visible-light transceiver devices 210, a time measuring unit 232, for generating receiving time information by measuring the times at which the visible-light signals are received, and a transmitter unit 233, for transmitting the receiving time information.

The operation of a localization system 200 according to the first embodiment of the present invention will be described below in more detail with reference to FIG. 3 through FIG. 7. For the sake of convenience, it will be assumed that the localization server 220 and the multiple visible-light transceiver devices 210 communicate via wired connections.

Figure 3:
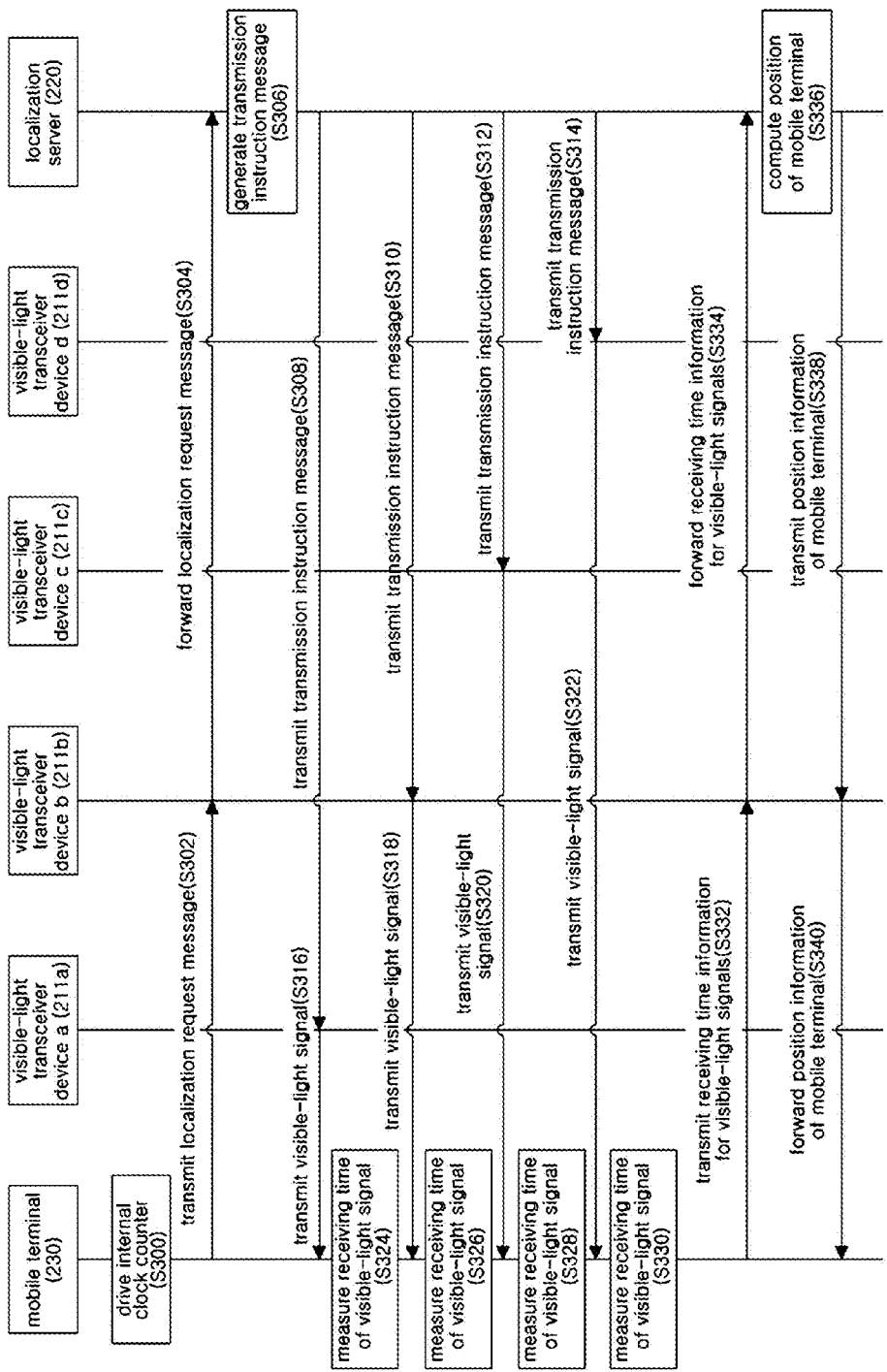
FIG. 3 is a flow diagram illustrating the overall flow of a method for localizing a mobile terminal according to a first embodiment of the present invention.

FIG. 3 is a flow diagram illustrating the overall flow of a method for localizing a mobile terminal 230 according to the first embodiment of the present invention. The process performed for each step will be described below in more detail.

First, in step S300, the mobile terminal 230 may drive an internal clock counter equipped in the time measuring unit 232, and in step S302, the mobile terminal 230 may transmit a localization request message.

Here, the localization request message can be a visible-light signal, and the localization request message transmitted from the mobile terminal 230 may be received by at least some of the multiple visible-light transceiver devices 210. In the example shown in FIG. 3, it is assumed that from among the multiple visible-light transceiver devices 210, the visible-light transceiver device b (210b) receives the localization request message in the form of a visible-light signal.

Afterwards, in step S304, the visible-light transceiver device b (210b) may forward the localization request message to the localization server 220. The forwarded localization request message may be received via the communication unit 223 equipped in the localization server 220.

Although it is not illustrated in FIG. 3, if the multiple visible-light transceiver devices 210 at this time are also performing data communication via visible light with other visible-light communication devices (not shown) located in the indoor space, then the data communication being performed between the multiple visible-light transceiver devices 210 and other visible-light communication devices (not shown) may be frozen, in order to transmit the visible-light signals for localizing the mobile terminal 230 as described below.

Continuing with the method, in steps S306 to S314, the localization server 220 may, by way of the control unit 221, control the transmissions of visible-light signals by the multiple visible-light transceiver devices 210.

To be more specific, in steps S306 to S314, the control unit 221 can provide control such that the multiple visible-light transceiver devices 210 sequentially transmit the visible-light signals for the duration of a particular first time period with no overlapping among the transmission times of the visible-light signals transmitted from the respective visible-light transceiver devices 210. Here, the visible-light signals can take the form of pilot signals used for localizing the mobile terminal 230. Also, the first time period can be the same or different for all of the multiple visible-light transceiver devices 210.

Taking a closer look, in step S306, the control unit 221 may generate messages for instructing the transmissions of visible-light signals (transmission instruction messages) by using the control message generating unit 224, and in steps S308 to S314, the control unit 221 may sequentially transmit the transmission instruction message to each of the multiple visible-light transceiver devices 210 through the communication unit 223.

In one example, if the distance from each of the multiple visible-light transceiver devices 210 to the localization server 220 is the same, the control unit 221 can sequentially send the transmission instruction messages to the multiple visible-light transceiver devices 210 in an arbitrary order. In another example, if the distance from each of the multiple visible-light transceiver devices 210 to the localization server 220 is different, the control unit 221 can sequentially transmit the transmission instruction messages beginning with the visible-light transceiver device 210 nearest to the localization server 220.

Here, the localization server 220 can transmit a distance measurement request message to each of the multiple visible-light transceiver devices 210, receive a distance measurement reply message transmitted by each of the multiple visible-light transceiver devices 210 in correspondence to receiving the distance measurement request message, and then compute the distances to the multiple visible-light transceiver devices 210 by using the differences between the transmission times of the distance measurement request message and the reception times of the distance measurement reply messages (i.e. the round trip times (RTT)). As will be described later on, the differences between the transmission times of the distance measurement request message and the reception times of the distance measurement reply messages can also be used for synchronizing the times at which the multiple visible-light transceiver devices 210 transmitted the visible-light signals. Such operation of the localization server 220 for measuring distances can also be performed prior to step S300 or prior to step S304.

Also, according to an embodiment of the present invention, the control unit 221 can determine the times for transmitting the transmission instruction messages to the multiple visible-light transceiver devices 210, respectively, in consideration of at least one of the distances from the localization server 220 to the multiple visible-light transceiver devices 210 and the first time period for each of the multiple visible-light transceiver devices 210. Here, the distances from the localization server 220 to the multiple visible-light transceiver devices 210 can be computed by using one-way trip times (OTT), which corresponds to a half of the RTT described above.

According to another embodiment of the present invention, the control unit 221 can determine the times for transmitting the transmission instruction messages to the multiple visible-light transceiver devices 210, respectively, further considering a particular second time period for avoiding overlapping between the visible-light signals transmitted sequentially from the multiple visible-light transceiver devices 210, respectively. Here, the second time period refers to a duration of time during which there is no visible-light signal emitted from any of the visible-light transceiver devices 210, and will be described later on in further detail.

Continuing with the method, in steps S316 to S322, each of the multiple visible-light transceiver devices 210 may transmit a visible-light signal through the visible-light transmitter unit 211, for the duration of a particular first time period from the time at which the respective transmission instruction message was received. Here, since the control unit 221 sequentially transmitted the transmission instruction messages with certain intervals in-between, the visible-light signals transmitted by the respective visible-light transceiver devices 210 may not overlap. Thus, the visible-light signals transmitted from a multiple number of visible-light transceiver devices 210 can be received without interference at the receiver unit 231 of the mobile terminal 230.

In other words, if the multiple number of visible-light transceiver devices 210 were to transmit the visible-light signals to the mobile terminal 230 simultaneously, then the multiple number of visible-light signals would be received at the mobile terminal 230 simultaneously, so that the position of the mobile terminal 230 could not be measured accurately due to the interference between the visible-light signals. In contrast, if the multiple visible-light transceiver devices 210 each transmit the visible-light signals for a first time period with no overlapping, as in an embodiment of the present invention, then all of the visible-light signals may be received without interference, and it is possible to accurately localize the mobile terminal 230.

Afterwards, in steps S324 to step S330, the mobile terminal 230 may measure the time at which each visible-light signal is received, using the internal clock counter equipped in the time measuring unit 232. In other words, in steps S324 to step S330, the mobile terminal 230 may generate information regarding the times at which the visible-light signals sequentially transmitted by the multiple visible-light transceiver devices 210, respectively, were received (receiving time information).

Below, a more detailed description will be provided, with reference to FIG. 4 through FIG. 6, on the operation of the control unit 221 of the localization server 220 for transmitting the transmission instruction messages, performed in steps S308 to S314, the operation of the multiple visible-light transceiver devices 210 for transmitting the visible-light signals, performed in steps S316 to S322, and the operation of the mobile terminal 230 for measuring the receiving times of the visible-light signals, performed in steps S324 to S330.

Figure 4:
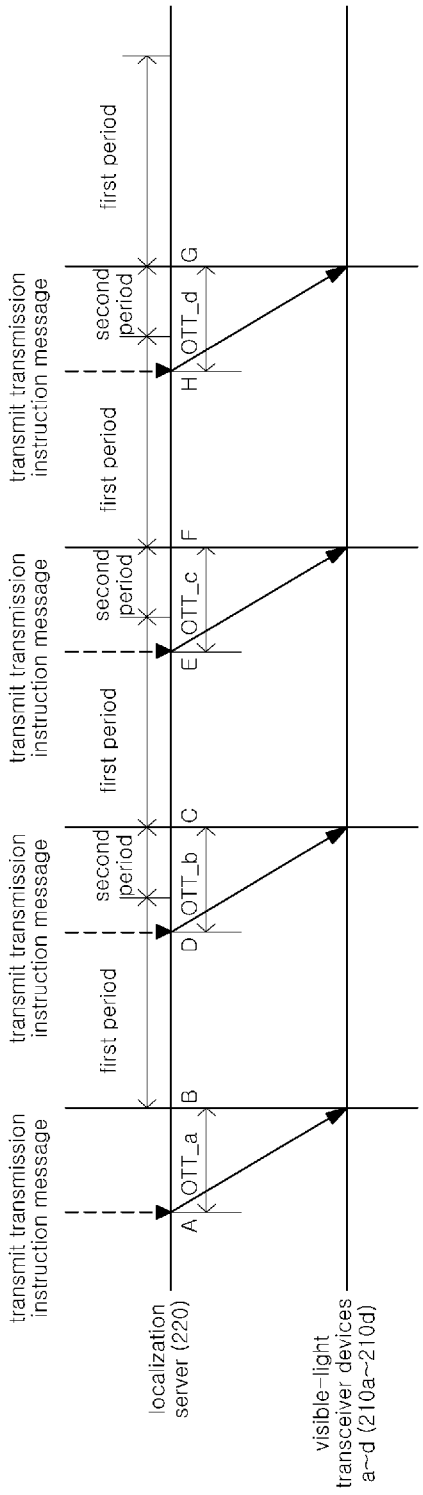
FIG. 4 and FIG. 5 illustrate operations in which the control unit in a localization server according to an embodiment of the present invention transmits a transmission instruction message.
Figure 5:
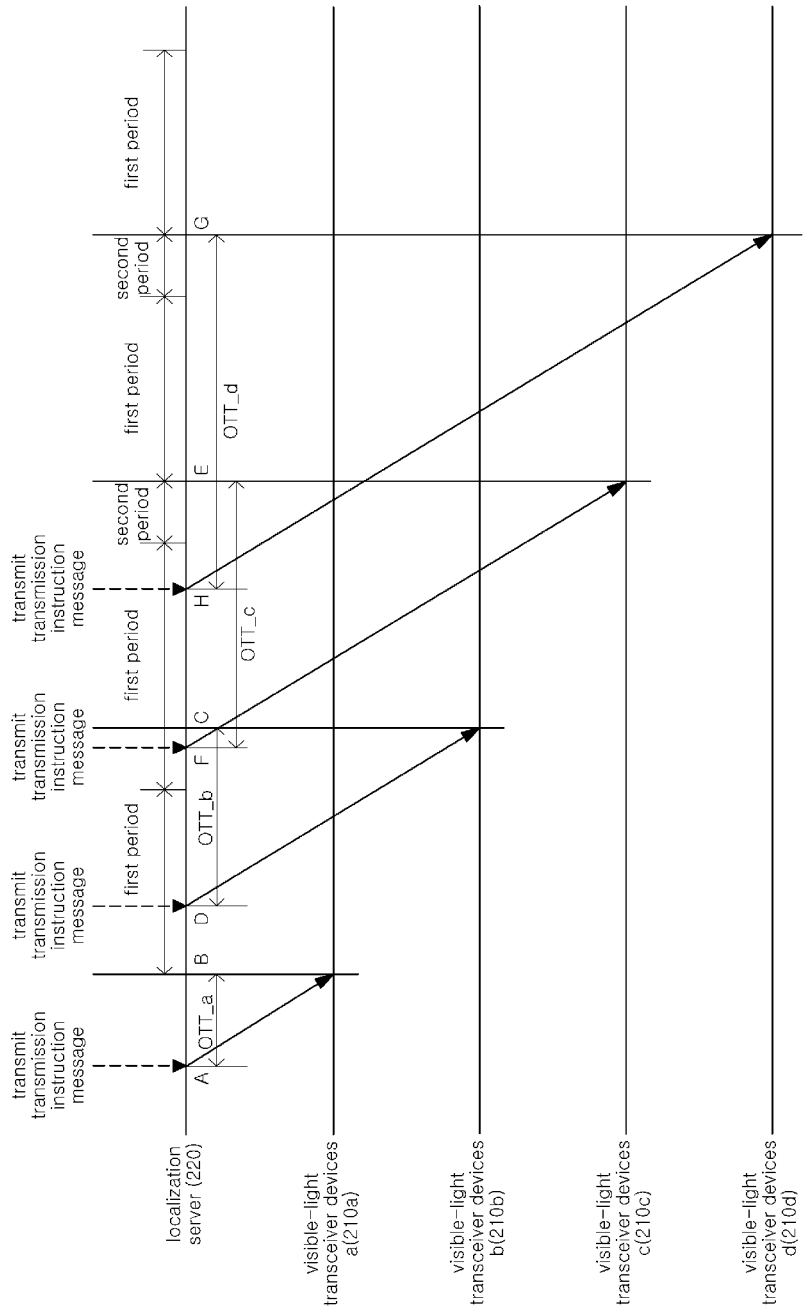

FIG. 4 and FIG. 5 are for illustrating operations in which the control unit 221 in a localization server 220 according to an embodiment of the present invention transmits a transmission instruction message.

To be more specific, FIG. 4 illustrates the concept of the control unit 221 sending the transmission instruction messages for a case where the multiple visible-light transceiver devices 210 are all at the same distance from the localization server 220, and FIG. 5 illustrates the concept of the control unit 221 transmitting the transmission instruction messages for a case where the multiple visible-light transceiver devices 210 are at different distances from the localization server 220.

The operation of the control unit 221 for transmitting the transmission instruction messages is described below with reference to FIG. 4 and FIG. 5.

First, at point A, the control unit 221 may transmit a transmission instruction message to a visible-light transceiver device a (210a), and at point B, which is after the duration of the OTT_a between the localization server 220 and the visible-light transceiver device a (210a), the transmission instruction message may be received by the visible-light transceiver device a (210a).

Afterwards, the control unit 221 may predict point D at which to transmit a transmission instruction message to a visible-light transceiver device b (210*b*), in consideration of the OTT_b between the localization server 220 and the visible-light transceiver device b (210*b*), the first time period during which the visible-light transceiver device a (210*a*) transmits a visible-light signal, and the second time period for preventing overlapping between the visible-light signals sequentially transmitted from the multiple visible-light transceiver devices 210, respectively (here, the second time period can be excluded from consideration), and may transmit the transmission instruction message to the visible-light transceiver device b (210*b*) at the predicted point D.

To be more specific, the control unit 221 may predict point C, which is after the duration of both the first time period and the second time period from point B, may predict point D, which is earlier than point C by the OTT_b between the localization server 220 and the visible-light transceiver device b (210*b*), and then may transmit the transmission instruction message to the visible-light transceiver device b (210*b*) at the predicted point D.

Afterwards, point F and point G may be predicted in the same manner as above, and the control unit 221 may transmit transmission instruction messages to a visible-light transceiver device c (210*c*) and a visible-light transceiver device d (210*d*) at point F and point G, respectively.

By the process described above, the visible-light transceiver device 211*a* through visible-light transceiver device 211*d* may sequentially receive the transmission instruction messages, and may emit visible-light signals when receiving the transmission instruction messages.

Also, the mobile terminal 230 may generate information on the receiving times of the visible-light signals by measuring the times at which the visible-light signals were received, through steps S324 to S330.

Below, a more detailed description will be provided, with reference to FIG. 6, on the concept of generating the receiving time information, which is information regarding the times at which the visible-light signals were received by the mobile terminal 230.

Figure 6:
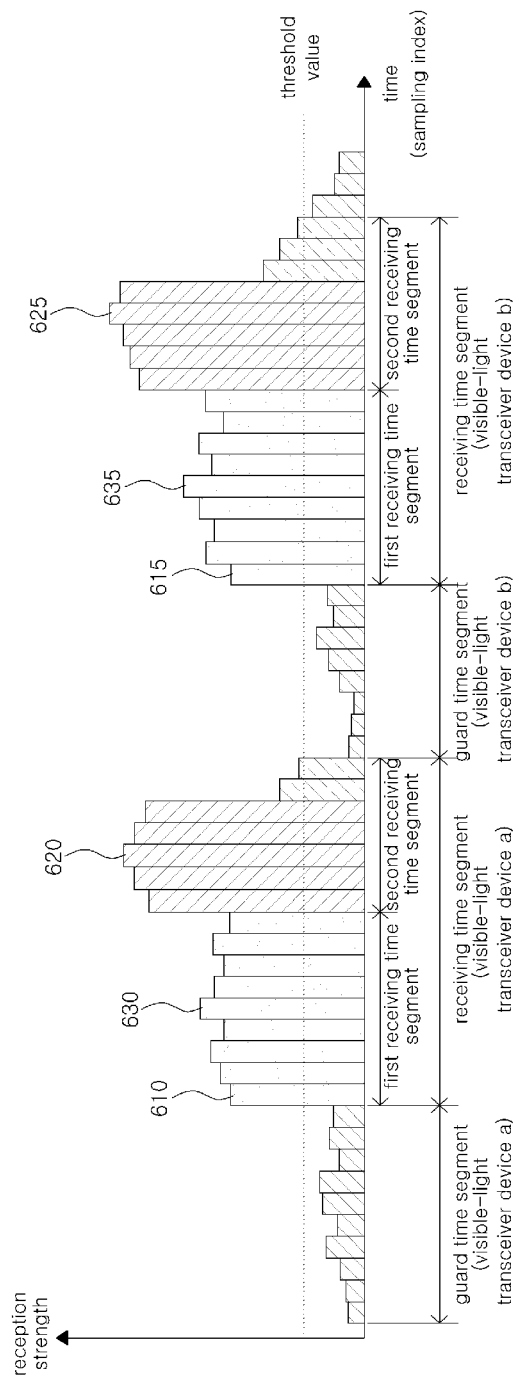
FIG. 6 illustrates an example of reception strengths of visible-light signals measured at a mobile terminal, when the visible-light signals are transmitted in accordance with a first time period and a second time period as described for FIG. 4 and FIG. 5.

FIG. 6 illustrates an example of reception strengths of visible-light signals measured at a mobile terminal 230, when the visible-light signals are transmitted in accordance with a first time period and a second time period as described for FIG. 4 and FIG. 5.

For convenience, FIG. 6 is illustrated for an example in which the mobile terminal 230 measures the reception strength of visible light discretely via sampling. However, the present invention is not thus limited, and the mobile terminal 230 can just as well measure the reception strength of visible light in a continuous manner.

Referring to FIG. 6, the mobile terminal 230 may repeatedly perform the operations of receiving visible-light signals having reception strengths smaller than a predetermined threshold value and of receiving visible-light signals having reception strengths greater than the threshold value. These operations correspond respectively to the transmissions of visible-light signals for the duration of the first time period and non-transmissions of visible-light signals for the duration of the second time period described above.

That is, as already described above, the visible-light transceiver devices 210 may sequentially transmit visible-light signals during the first time period and may not emit visible-light signals during the second time period succeeding the first time period, and therefore, the reception strength of visible light measured during a time segment corresponding to the first time period may be greater than or equal to the threshold value, while the reception strength of visible light measured during a time segment corresponding to the second time period may be lower than the threshold value.

Thus, as illustrated in FIG. 6, the time segment for the mobile terminal 230 associated with receiving visible-light signals may include a time segment of receiving visible-light signals (hereinafter referred to as the "receiving time segment"), corresponding to the first time period, and a time segment of not receiving visible-light signals (hereinafter referred to as the "guard time segment"), corresponding to the second time period.

In this case, the time measuring unit 232 of the mobile terminal 230 can generate information regarding a time point lying within a time segment, in which visible-light signals having reception strengths greater than or equal to the threshold value are received, as the receiving time information described above. That is, the information regarding the times at which the visible-light signals are received at the mobile terminal 230 can include information on any one time point that lies within the time segment in which visible-light signals having reception strengths greater than or equal to a predetermined threshold value are received.

To be more specific, according to the first embodiment of the present invention, the point at which a reception strength that is greater than or equal to the threshold value is first measured can be computed by the mobile terminal 230 as the point at which a visible-light signal is received for the corresponding receiving time segment. In other words, the time point within the receiving time segment computed as the point of receiving a visible-light signal can correspond to the starting point of the time segment.

Thus, for an example such as that illustrated in FIG. 6 in which the reception strength of visible light is measured discretely, the point at which the first reception strength sample 610, 615 is measured in each receiving time segment can be computed as the point of receiving the visible-light signal for the respective receiving time segment.

Also, according to a second embodiment of the present invention, the point within a receiving time segment at which the maximum reception strength is measured can be computed by the mobile terminal 230 as the point at which a visible-light signal is received for the corresponding receiving time segment. In other words, the time point within the receiving time segment computed as the point of receiving a visible-light signal can correspond to the point where the maximum reception strength is measured.

Thus, for an example such as that illustrated in FIG. 6 in which the reception strength of visible light is measured discretely, the point at which the maximum reception strength sample 620, 625 is measured in each receiving time segment can be computed as the point of receiving the visible-light signal for the respective receiving time segment.

A visible-light signal received at the mobile terminal 230 can be a line-of-sight (LOS) visible-light signal received directly from a visible-light transceiver device 210, or a non-line-of-sight (NLOS) visible-light signal received reflected off an object such as a wall, pillar, etc., after being transmitted from a visible-light transceiver device 210.

In this case, since a NLOS visible-light signal, which is received after being reflected off an object, cannot accurately convey the distance between the visible-light transceiver device 210 and the mobile terminal 230, computing the distance between a visible-light transceiver device 210 and the mobile terminal 230 using NLOS visible-light signals can cause errors in localizing the mobile terminal 230.

Thus, according to a third embodiment of the present invention, the mobile terminal 230 can compute the receiving time information for visible-light signals received at the mobile terminal 230 by using only LOS visible-light signals from among the visible-light signals received within a receiving time segment.

Since LOS visible-light signals generally arrive at the mobile terminal 230 before NLOS visible-light signals, a receiving time segment can be divided into a receiving time segment for LOS visible-light signals located at the front (hereinafter referred to as the "first receiving time segment") and a receiving time segment for NLOS visible-light signals located at the rear (hereinafter referred to as the "second receiving time segment").

In this case, the point within the first receiving time segment at which the maximum reception strength is measured can be computed by the mobile terminal 230 as the point at which a visible-light signal is received for the corresponding receiving time segment. In other words, the time point within the receiving time segment computed as the point of receiving a visible-light signal can correspond to the point where the maximum reception strength is measured in the first time segment during which LOS visible-light signals are received.

Thus, for an example such as that illustrated in FIG. 6 in which the reception strength of visible light is measured discretely, the point at which the maximum reception strength sample 630, 635 is measured in the first receiving time segment included in each receiving time segment can be computed as the point of receiving the visible-light signal for the respective receiving time segment.

Referring again to FIG. 3, a description is provided below on a method for localizing a mobile terminal 230 using a localization server 220 according to the first embodiment of the present invention.

In step S332, the mobile terminal 230 may transmit the receiving time information for visible-light signals. Here, the receiving time information itself can also be transmitted in the form of a visible-light signal.

The transmitted receiving time information having the form of a visible-light signal may be received by visible-light receiver units 212 equipped in at least one of the multiple visible-light transceiver devices 210. In FIG. 3, it is assumed that, from among the multiple visible-light transceiver devices 210, the visible-light transceiver device b (210b) receives the receiving time information in the form of a visible-light signal.

Afterwards, in step S334, the visible-light transceiver device b (210b) may send the receiving time information to the localization server 220, and in step S336, the localization server 220 may compute the position of the mobile terminal 230 using the position computing unit 222.

According to an embodiment of the present invention, the position computing unit 222 can compute the position of the mobile terminal 230 by using the information regarding times at which the control unit 221 transmitted the transmission instruction messages to the multiple visible-light transceiver devices 210, respectively, the distance information regarding distances between the localization server 220 and the multiple visible-light transceiver devices 210, and the time information regarding when the visible-light signals transmitted respectively from the multiple visible-light transceiver devices 210 were received at the mobile terminal 230.

To be more specific, the position computing unit 222 may synchronize the times at which the multiple visible-light transceiver devices 210 respectively transmitted the visible-light signals, based on the information regarding the times at which the control unit 221 transmitted the transmission instruction messages to the plurality of visible-light transceiver devices and the distance information regarding distances between the localization server 220 and the multiple visible-light transceiver devices 210, and may afterwards compute the position of the mobile terminal 230 according to a TDoA method by using the differences in the times at which the visible-light signals transmitted respectively from the multiple visible-light transceiver devices 210 were received at the mobile terminal 230. Here, the OTT or the RTT described above can be used for synchronizing the times at which the multiple visible-light transceiver devices 210 respectively transmitted the visible-light signals.

Afterwards, in step S338, the localization server 220 may send the position information of the mobile terminal to the visible-light transceiver device b (210b) via the communication unit 223, and in step S340, the visible-light transceiver device b (210b) may forward the position information of the mobile terminal to the mobile terminal 230 in the form of a visible-light signal.

In this way, the method for localizing a mobile terminal 230 using a localization server 220 according to the first embodiment of the present invention enables a multiple number of visible-light transceiver devices 210 to emit visible light to a mobile terminal 230 for a particular duration of time with no overlapping, thus preventing interference between visible-light signals at the mobile terminal 230 and making it possible to accurately measure the position of the mobile terminal 230.

Figure 7:
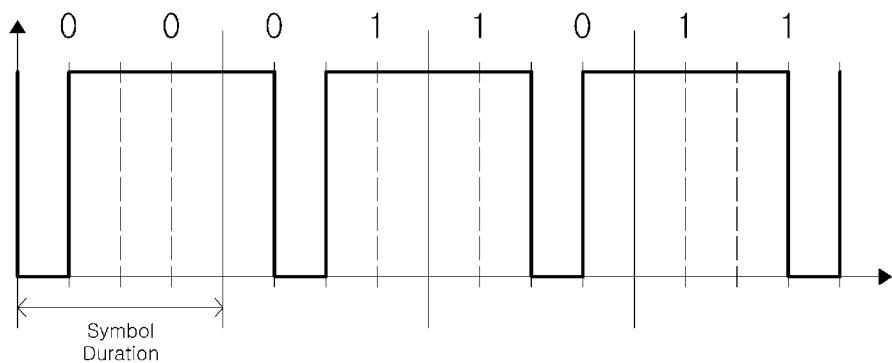
FIG. 7 illustrates an example of visible-light signals transmitted by multiple visible-light transceiver devices for a first time period according to an embodiment of the present invention.

FIG. 7 illustrates an example of visible-light signals transmitted by multiple visible-light transceiver devices 210 for a first time period according to an embodiment of the present invention, showing an example of a visible-light signal pattern defined in the IEEE802.17.7 standard for visible-light communication.

Referring to FIG. 7, inverted 4-PPM (pulse position moderation) as defined in IEEE802.17.7 expresses one bit by a transmission or non-transmission (emission or non-emission) of visible light and defines one symbol with four bits. Each symbol can follow any one of the four visible-light emission patterns illustrated in FIG. 7.

Applying this to the present invention, the first period during which the multiple visible-light transceiver devices 210 emit visible-light signals can correspond to a symbol duration defined by four bits. In other words, the first period can be composed of four sub-periods, a visible-light signal can be composed of two or more bits corresponding to two or more sub-periods, and the two or more bits can each have one of a high level value and a low level value, the high level value corresponding to a transmission of visible light, and the low level value corresponding to a non-transmission of visible light. Of course, the present invention is not thus limited, and the number of sub-periods forming the first period and the number of bits forming a visible-light signal can be an arbitrary value of 2 or higher.

In order for the visible-light signals transmitted from the multiple visible-light transceiver devices 210 to be received separately, it is preferable that there be no overlapping of the first period for each signal, and it is preferable that the point at which the reception is completed for a visible-light signal received for a previous time point be distinctly differentiable from the point at which the reception begins for a visible-light signal received for a current time point. Here, since there may be no visible light received at the mobile terminal 230 during rest times that exist between each first period, the last sub-period of the visible-light signal for the previous time point and the first sub-period of the visible-light signal for the current time point may involve states for transmitting visible light, in order to differentiate the multiple visible-light signals.

In one example, if the visible-light emission pattern described in FIG. 7 is used, a visible-light signal used for localization may take either one of the [0 1] pattern and the [1 0] pattern.

In other words, according to an embodiment of the present invention, it may be preferable that each of the first bit and the last bit of the two or more bits forming a visible-light signal has high level value (i.e. each of the first and the last of the two or more sub-periods involves state for emitting visible light).

Figure 8:
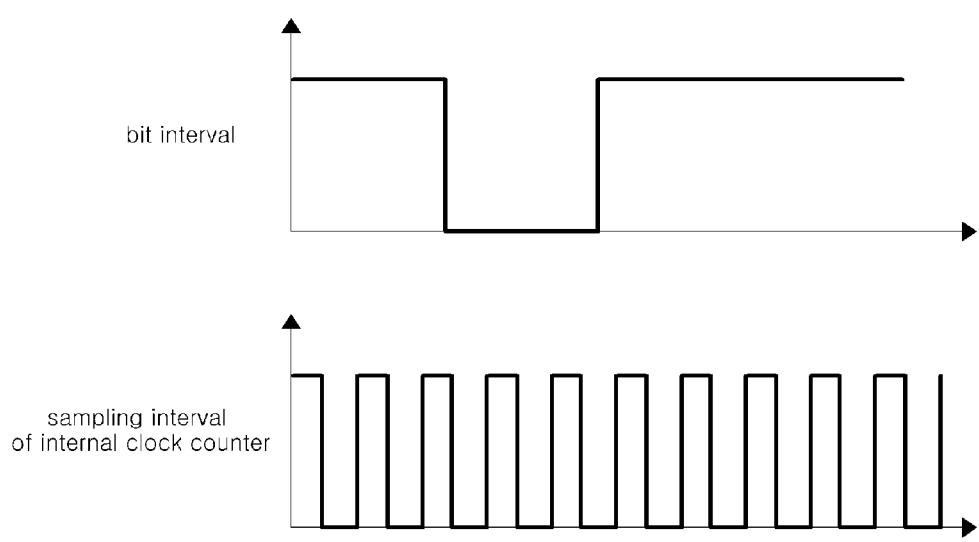
FIG. 8 illustrates the bit interval of a visible-light signal and the sampling interval of an internal clock counter included in a mobile terminal according to an embodiment of the present invention.

In this case, according to an embodiment of the present invention, it may be preferable that a sampling interval of the internal clock counter be smaller than the bit interval (i.e. sub-period) forming the visible-light signal, as illustrated in FIG. 8. This is to increase the accuracy of localizing the mobile terminal 230, and a smaller sampling interval of the internal clock counter may enable a more accurate localization. For example, the bit interval can be 0.05 μsec, and the sampling interval of the internal clock counter can be 1 nsec.

In a second embodiment of the present invention, the operation described above for localizing the mobile terminal using receiving time information relating to when the visible-light signals were received, can be performed directly at the mobile terminal 230 instead of the localization server 220.

Figure 9:
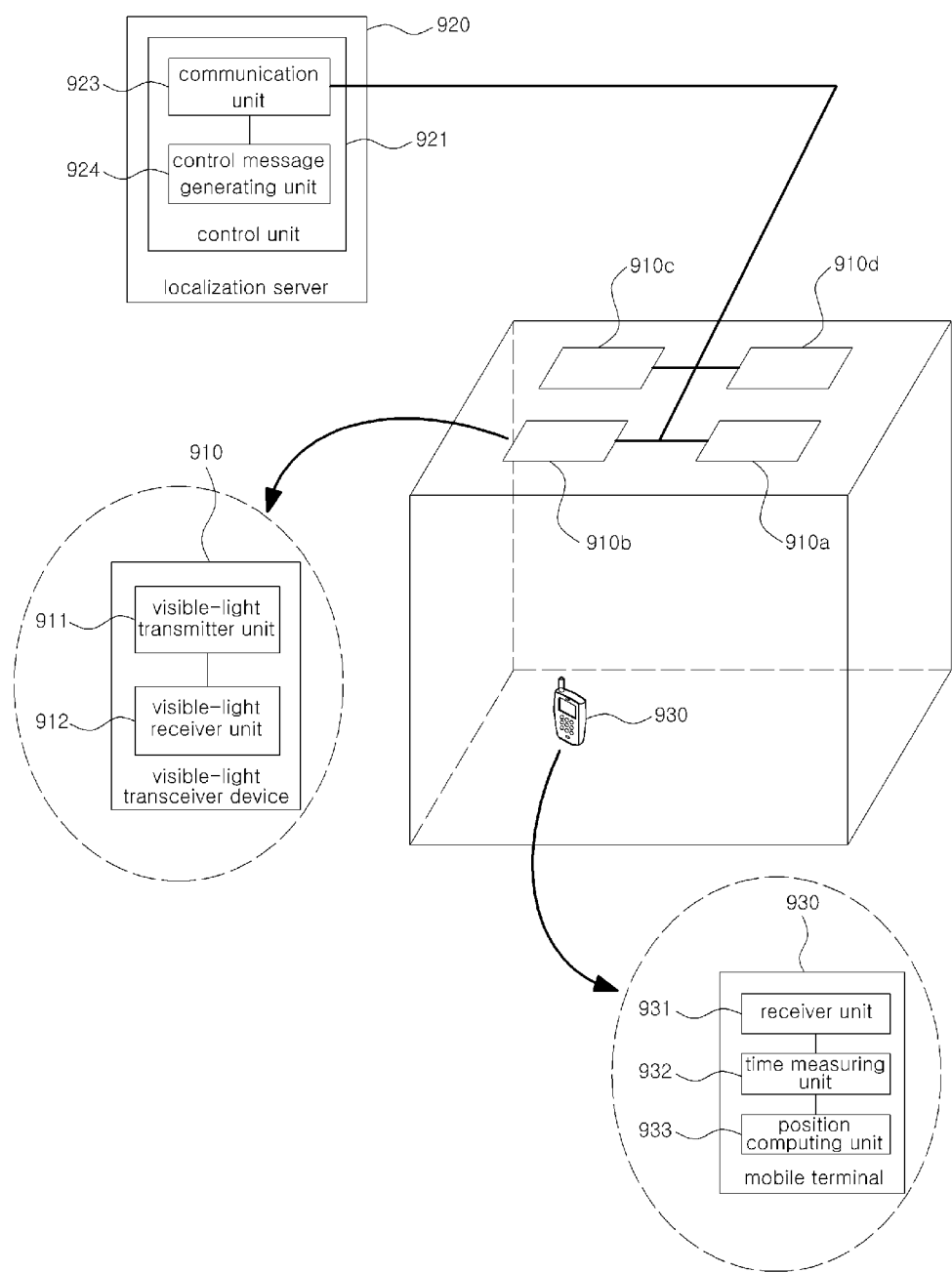
FIG. 9 schematically illustrates a localization system for a mobile terminal according to a second embodiment of the present invention.
Figure 10:
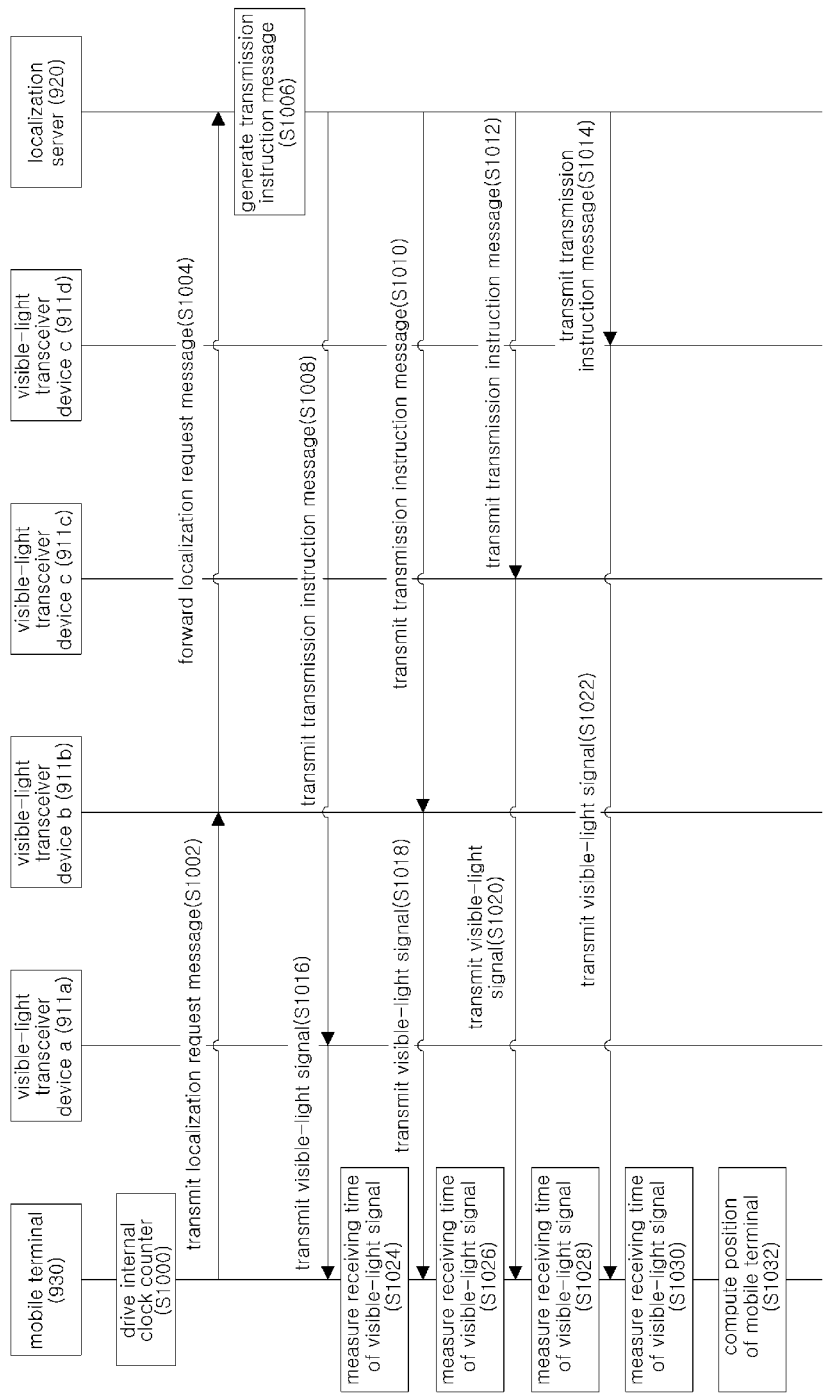
FIG. 10 is a flow diagram illustrating the overall flow of a method for localizing a mobile terminal according to a second embodiment of the present invention.

FIG. 9 schematically illustrates a localization system for a mobile terminal according to a second embodiment of the present invention, and FIG. 10 is a flow diagram illustrating the overall flow of a method for localizing a mobile terminal according to the second embodiment of the present invention.

Referring to FIG. 9, compared with the localization system 200 according to the first embodiment of the present invention described above with reference to FIG. 2, the localization server 920 in a localization system 900 according to the second embodiment of the present invention may not include a position computing unit, and the mobile terminal 930 may include the position computing unit 933 instead of the transmitter unit. Besides this difference, the other aspects of composition may be kept the same. That is, in this embodiment, the operation of localizing the mobile terminal 930 can be performed at the position computing unit 933 equipped in the mobile terminal 930, not the localization server 920.

Referring to FIG. 10, in this case, the operations of steps S1000 to S1030, which are a series of steps for measuring the receiving times of the visible-light signals, may be the same as the operations of steps S300 to S330 described above with reference to FIG. 3, but in this embodiment, the mobile terminal 930 may not transmit the receiving time information for the visible-light signals to the localization server 920 (i.e. steps S332 to S334 of FIG. 3 may not be performed), and may directly compute its position in step S1032 using the receiving time information of the measured visible-light signals (consequently, steps S338 to S340 of FIG. 3 may also be omitted).

Also, although it is not illustrated in FIG. 10, the mobile terminal 930 can receive the information used for localizing the mobile terminal 930 as described above, i.e. the "information regarding times at which the localization server 920 transmitted the transmission instruction messages to the multiple visible-light transceiver devices 910" and the "distance information regarding distances between the localization server 920 and the multiple visible-light transceiver devices 910," from the localization server 920 through the visible-light transceiver devices 910.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents.

The invention claimed is:

1. A mobile terminal capable of localization, the mobile terminal comprising:
a receiver unit configured to receive visible-light signals, the visible-light signals sequentially transmitted from a plurality of visible-light transceiver devices for a particular first time period such that there is no overlapping of transmission times;
a time measuring unit configured to generate receiving time information regarding times at which the sequentially transmitted visible-light signals are received information; and
a position computing unit configured to compute a position of the mobile terminal by using the receiving time information of the sequentially transmitted visible-light signals, wherein
the first time period is composed of two or more sub-periods,
the visible-light signal is composed of two or more bits corresponding to the two or more sub-periods, the two or more bits each having one of a high level value and a low level value, the high level value corresponding to a transmission of visible light, the low level value corresponding to a non-transmission of visible light, and
each of a first bit and a last bit from among the two or more bits has high level value.

2. The mobile terminal of claim 1, wherein each of the plurality of visible-light transceiver devices sequentially receives a transmission instruction message sent from a localization server instructing the visible-light transceiver device to transmit the visible-light signal, and transmits the visible-light signal for the first time period from a point of receiving the transmission instruction message, and
the position computing unit computes the position of the mobile terminal by using information regarding times at which the localization server transmitted the transmission instruction messages to the plurality of visible-light transceiver devices respectively, distance information regarding distances between the localization server and the plurality of visible-light transceiver devices, and the time information regarding when the visible-light signals transmitted respectively from the plurality of visible-light transceiver devices were received at the receiver unit.

3. The mobile terminal of claim 2, wherein the position computing unit synchronizes the transmission times of the visible-light signals transmitted respectively from the plurality of visible-light transceiver devices based on the information regarding times at which the localization server transmitted the transmission instruction messages to the plurality of visible-light transceiver devices respectively and the distance information regarding distances between the localization server and the plurality of visible-light transceiver devices, and afterwards computes the position of the mobile terminal by using differences in times at which the visible-light signals transmitted respectively from the plurality of visible-light transceiver devices were received at the receiver unit.

4. The mobile terminal of claim 1, wherein the time information regarding when the visible-light signals are received at the receiver unit includes information on any one time point lying within a time segment in which a visible-light signal having a reception strength greater than or equal to a predetermined threshold value is received.

5. The mobile terminal of claim 4, wherein the any one time point corresponds to a starting point of the time segment in which a visible-light signal having a reception strength greater than or equal to the predetermined threshold value is received.

6. The mobile terminal of claim 4, wherein the any one time point corresponds to a point at which a maximum reception strength is measured within the time segment in which a visible-light signal having a reception strength greater than or equal to the predetermined threshold value is received.

7. The mobile terminal of claim 4, wherein the time segment in which a visible-light signal having a reception strength greater than or equal to the predetermined threshold value is received comprises a first receiving time segment in which a line-of-sight (LOS) visible-light signal is received and a second receiving time segment in which a non-line-of-sight (NLOS) visible-light signal is received, and the any one time point corresponds to a point at which a maximum reception strength is measured within the first receiving time segment.

8. A method for localizing a mobile terminal, the method comprising:

receiving visible-light signals, the visible-light signals sequentially transmitted from a plurality of visible-light transceiver devices for a particular first time period such that there is no overlapping of transmission times;

generating receiving time information regarding times at which the sequentially transmitted visible-light signals are received; and computing a position of the mobile terminal by using the receiving time information of the sequentially transmitted visible-light signals, wherein the first time period is composed of two or more sub-periods, the visible-light signal is composed of two or more bits corresponding to the two or more sub-periods, the two or more bits each having one of a high level value and a low level value, the high level value corresponding to a transmission of visible light, the low level value corresponding to a non-transmission of visible light, and each of a first bit and a last bit from among the two or more bits has high level value.

\* \* \* \* \*